United States Patent Office 3,687,842
Patented Aug. 29, 1972

3,687,842
OSMOSIS PROCESS
Lino Credali, Bologna, and Paolo Parrini, Novara, Italy, assignors to Consiglio Nazionale Delle Ricerche and Montecatini Edison S.p.A., Rome, Italy
No Drawing. Filed July 6, 1970, Ser. No. 52,733
Claims priority, application Italy, July 8, 1969, 19,317/69
Int. Cl. B01d 13/00
U.S. Cl. 210—23    2 Claims

ABSTRACT OF THE DISCLOSURE

Osmosis process utilizing as the semi-permeable membrane a polyamide comprising the reaction product of a piperazine with a dihalide of fumaric acid or of a substituted fumaric acid.

BACKGROUND OF THE INVENTION

(1) Field of the invention

The present invention relates to the use, in reverse osmosis processes, of polymeric materials which have not heretofore been employed. More particularly, this invention relates to the use of formed articles made of such polymeric materials, these materials having a high permeability to water and being capable of rejecting salts dissolved therein, as semi-permeable membranes in reverse osmosis processes for the desalinization of waters, such as brackish water, sea water, and other waters having various concentrations of dissolved inorganic salts.

(2) Description of the prior art

As is well known, the desalinization (demineralization) of saline waters by means of a reverse osmosis process (sometimes also described as ultra-filtering), requires the use of high pressures and selective membranes which are capable of permitting pure water to pass therethrough while rejecting or preventing passage of salts dissolved in said waters.

According to this proces, saline water is pushed against the membrane by applying a hydraulic pressure greater thant the osmotic pressure of the saline solution being treated. A flow of water thereby occurs due to the difference in hydraulic pressure applied to the two opposite sides of the membrane, said flow being in a direction opposite to the direction normally observed in direct osmosis, where the flow is due to a concentration gradient of the solute on opposite sides of the membrane. Under these conditions, the solution which has passed across the membrane has a greatly reduced saline content.

The water output rate and the degree of demineralization depend on various parameters of the process as well as on the properties of the semi-permeable membrane, such as for instance:

(1) the composition of the solution in contact with the semi-permeable membrane;
(2) the pressure exerted on the solution in contact with the semi-permeable membrane;
(3) the flow rate and the degree of agitation of the solution at the surface of the semi-permeable membrane;
(4) the temperature;
(5) the chemical nature of the semi-permeable membrane and the nature of the surface of the semi-permeable membrane in contact with the saline water; and
(6) the physical nature of the permeable structure of the membrane.

Membranes of the conventional type used for reverse osmosis processes are generally made of special cellulose esters which possess selective properties, since they are permeable to the solvents but not to the solutes. More particularly, a polymeric material is selective towards a certain solute when a thick and homogeneous film of such material lets the solvent pass therethrough and does not permit passage of the solute. Homogeneous films of cellulose esters, in fact, exhibit the property of being permeable to water while repelling salts dissolved therein.

The quantity of solvent which passes through the film depends, all other conditions remaining the same, on the thickness of the homogeneous film.

Membranes of the known type, based on cellulose esters and having a particular physical structure, permit a good flow of the water therethrough with a saline rejection of greater than 90%.

Such membranes are generally formed by a relatively thick and homogeneous upper layer and a porous substructure.

Methods for the preparation of such membranes and their use in desalinization processes by reverse osmosis have been described in many patents and publications. See, e.g., U.S. Pats. 3,133,132; 3,133,137; 3,170,867; 3,283,042; 3,285,765; 3,250,701; 3,290,286; and French Pats. 1,510,749 and 1,528,016.

Unfortunately however, the use of membranes based on cellulose esters in reverse osmosis processes results in a number of difficulties and drawbacks. For instance, these polymeric materials do not possess sufficiently high chemical resistance and, in particular, are not very resistant to hydrolysis by the saline solutions to be purified. Also, such polymeric materials are rather sensitive to variations in pH. Moreover, such polymeric materials are characterized by a low thermal stability, so that it is possible to use them only at relatively low operational temperatures, that is, at temperatures close to room temperature, to thereby avoid the occurrence of chemical modifications in their structure. Additionally, such polymeric materials possess only a relatively low resistance to bacterial degradation, and further have a low resistance to mechanical compression. Finally, cellulose has a low permeability to water. For this reason, in order to obtain high flows of desalinized water (for surface unit and for time unit), it is necessary to use films or membrane with an active desalinizing layer having a thickness generally less than 0.2 micron.

SUMMARY OF THE INVENTION

The present invention provides polymeric materials, in the form of shaped articles such as films, membranes, porous supports, hollow fibers and the like, for use in reverse osmosis separation and concentration processes. These materials obviate the foregoing difficulties and drawbacks related to the use of materials based on cellulose esters.

We use, in reverse osmosis separation and concentration processess, formed article, such as films, membranes, porous supports, hollow fibers and the like, which comprise synthetic materials having a polyamide structure. The polyamide structure is obtained by reacting piperazine or a substituted derivative thereof with a dihalide of fumaric acid or a substituted derivative thereof. The preparation of such polyamides is described, for example, in Italian Pats. Nos. 793,191 and 852,477 as well as in United States Patent No. 3,143,527. The polyamide structure is characterized by the structural unit of the Formula I

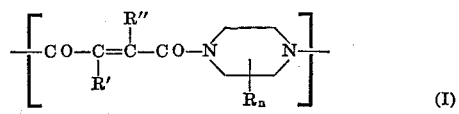

wherein the two carbonyl groups are bound in a trans position to the two adjacent carbon atoms bound to each other by a double bond: $n$ is either zero or a whole number from 1 to 8; R is a substituent such as alkyl, e.g., methyl or ethyl; cycloalkyl; alkoxy; aryl; aryloxy; arylalkoxy or halogen; and R' and R" are each selected from the group consisting of hydrogen; alkyl, e.g. methyl or ethyl; cycloalkyl; aryl and halogen.

DESCRIPTION OF THE PREFERRED EMBODIMENTS

The piperazines used to form the foregoing polymeric materials have the structure defined in Formula II

(II)

wherein $n$ is either zero or a whole number from 1 to 8; and R is a substituent such as alkyl, e.g., ethyl or methyl cycloalkyl; alkoxy; aryl, aryloxy; arylalkoxy; or halogen. The substituent R groups, when present greater than 1, may be arranged in any steric position whatsoever with respect to the ring. Thus, it is to be understood that Formula II includes pure stereoisomers (cis and trans) as well as mixtures thereof.

Specific examples of piperazines for use in forming the polymeric materials include piperazine; mono-, di-, tri- and tetra-methyl piperazines and the corresponding ethyl-piperazines; penta-, hexa-, hepta-, and octamethylpiperazines; 2,3,5-tri-n-butylpiperazine; 2,3,5,6-tetraphenyl-piperazine; 2 - phenyl-piperazine; 2,5 - dinaphthylpiperazine; 2,2,3,5,5,6 - hexaethylpiperazine; phenylmethylpiperazine; propylpiperazine; butylpiperazine; pentylpiperazine; 2,5-diphenylpiperazine; 2,6-dipropylpiperazine; 2,5-di-n-butyl-piperazine; 2,3,5-tripropylpiperazine; 2,3,5,6-tetra-n-propyl-piperazine; 2,5-divinylpiperazine; etc.

The fumaric acid derivatives used to form the foregoing polymeric materials have the structure defined in Formula III

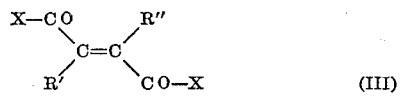

(III)

wherein X is halogen, and R' and R" are each selected from the group consisting of hydrogen; alkyl, e.g., methyl or ethyl; cycloalkyl; aryl and halogen.

Specific examples of the resultant polymeric materials include:

poly(piperazinfumaramide)
poly(2-methyl-piperazinfumaramide)
poly(trans-2,5-dimethyl-piperazinfumaramide
poly(cis-2,5-dimethylpiperazinfumaramide)
poly(cis,trans-2,5-dimethyl-piperazinfumaramide)
poly(piperazinmesaconamide)
poly(2-methyl-piperazinmesaconamide)
poly(trans-2,5-dimethyl-piperazinmesaconamide)
poly(cis-2,5-dimethyl-piperazinmesaconamide)
poly(cis,trans-2,5-dimethyl-piperazinmesaconamide).

Other examples include copolyamides comprising an acid of structure III with two or more different amines of structure II; and copolyamides comprising two or more different acids of structure III with anamine of structure II.

Furthermore, polymeric materials formed of blends of the polyamides (or copolyamides) of the above-mentioned type, or of blends of polyamides of the above-mentioned type in admixture with other polyamides having a structure not containing the piperazine unit, such as, for instance, polypyrrolidone, polycaprolactam, polyhexamethylenadipamide and the like may also be advantageously used.

The polymeric materials which we use in reverse osmosis separation and concentration processes have a chemical structure which is completely different from that of the polymers heretofore used, and may be readily formed into films, membranes or other shapes suitable for use in reverse osmosis processes.

These polymeric materials, in general, are soluble in common solvents such as, for example, phenol, m-cresol, 2-chloroethanol, chloroform/methanol mixtures, formic acid, and also strong acids such as concentrated sulfuric acid, trifluoroacetic acid, and mixtures of HCl (36%) with methanol.

Certain of these polymers have a melting or softening point sufficiently high to permit their transformation into shaped bodies. From solutions thereof, by means of a heat-heat-forming process, according to conventional methods, with or without the addition of special substances such as water, methanol, magnesium perchlorate, perchloric acids, maleic acid, formamide, dimethylformamide and the like, it is possible to obtain films, membranes or other formed bodies having physical shapes suitable for use in reverse osmosis processes. The phyical form of such membranes obtained according to the conventional methods, is of flat configuration, due to the relative ease of forming. Sometimes the membranes may also be used in tubular shape or also as hollow fibers.

According to a preferred operational method, membranes for use in reverse osmosis processes may be conveniently prepared by bonding ultra-thin polymeric films, comprising polymeric materials of the above described type and thus capable of rejecting salts, with porous substrates which act as supports for the films themselves. These porous supports, which possess a very high permeability, may be formed from a polymeric material of the same nature as that of the selectively permeable film, or may be made from completely different materials.

We have found that when a film or membrane made of the above described polymeric materials is placed into a reverse osmosis cell and a saline solution is pushed against the film or membrane, at a pressure greater than the osmotic pressure of the solution, an aqueous solution that is considerably enriched in soft (demineralized) water will be obtained.

The desalinization capacity (expressed as percentage of saline rejection) of the films or membranes comprising the polymeric materials of the above indicated type, may vary from 1 to more than 99%. This capacity can be greater than 98% for chlorides and greater than 99% for sulfates and carbonates.

Moreover, films and membranes made of the above indicated polymeric materials are characterized by an intrinsic permeability to water which is very high and is surprisingly superior to the permeability of films or membranes of the known cellulose acetate type (with an acetyl group content of 38.9% with respect to the weight of the cellulose).

The higher permeability to water of the polymeric materials used in accordance with the present invention is evidenced by the higher values of permeability to water for completely dry films, this permeability being calculated according to the method of Lonsdale, Merten and Riley in Journal of Applied Polymer Science 9, 1341 (1965). This property enables one to achieve surprisingly high flow rates of produced water. Production rates may easily exceed 400 liters per day per square meter of film surface when the thickness of the relatively thick, homogeneous surface layer is between 0.2 and 3 microns.

The polymeric materials described above, in the form of shaped articles such as films, membranes, porous supports, hollow fibers and the like, are characterized by high chemical resistance and, in particular, are resistant to hydrolysis, are insensitive to variations in pH, and are thermally stable over a wide range of temperatures.

The films, membranes and porous supports wholly or partially made up of these polymeric materials are mechanically resistant, tough and flexible, both when dry and when in the moist state, and may be used over a wide range of temperatures, even temperatures exceeding 100° C., without the occurrence of any chemical changes in their structure.

The polymeric materials of the above indicated type and in the above specified shapes may be used in reverse osmosis processes for the demineralization of saline waters, and for obtaining potable water (with a total solids content lower than 500 p.p.m.) from brackish water and sea water, according to single or multi-stage processes.

Although our description of the use of the membranes, films, porous supports, hollow fibers and the like comprising polymeric materials of the above mentioned type has primarily concerned demineralization of saline waters, it is to be understood that these materials may be used equally well in all other separation processes to which the principle of reverse osmosis may be applied. Examples of such other processes are: treatment and purification of industrial waters; purification and potabilization of polluted waters; concentration and recovery of various chemical compounds such as chlorides, sulfates, borates, carbonates, nitrates, fertilizers, glutamates, tannins; concentration of foodstuffs such as citrus juices, tomato juice, preserves and fruit juices in general, sugar solutions, milk, tea and coffee extracts; separation of azeotropic products; separation and concentration of biological and pharmaceutical products such as hormones, proteins, vitamins, antibiotics, vaccines, aminoacids and the like, and all other separation and concentration processes in which the reverse osmosis principle may be used.

The following examples will further illustrate our invention. All parts are by weight unless otherwise stated.

EXAMPLE 1

This example demonstrates that the polymeric materials used in accordance with the invention have a high permeability to water, and that their use in a process for the desalinization of a saline solution, according to the principle of reverse osmosis, allows one to considerably reduce the concentration of salt dissolved therein.

(A) Preparation of completely dry films for reverse osmosis

The films of polymeric materials were prepared from solutions of the polymer in a suitable solvent. The concentration of the polymer in the solution was between 5% and 10% by weight. Either formic acid or a chloroform/methanol mixture (in a weight ratio of 88/12) was used as the solvent.

The de-aerated homogeneous solution was spread over a glass plate by means of a film-spreader. The thus formed films were permitted to dry at 30° C. for several hours, until complete evaporation of the solvent had occurred. Thereafter, the films were removed from the glass plate, and they were then tough, transparent and homogeneous.

By regulating the thickness of the film-spreader and the concentration of the solution, it was possible to obtain films with a final thickness between 6 and 100 microns. Films with a thickness below 6 microns were prepared by immersing a glass plate vertically into the polymer solution. This glass plate remained in the solution for at least 10 minutes. It was vertically extracted from the solution at a speed of about 0.5 cm./sec. The glass plate was then placed horizontally to rest for a few hours at 30° C., until complete evaporation of the solvent had occurred. Then the glass plate was immersed into water so as to allow detachment and flotation of the film.

By regulating the speed of extraction of the glass plate from the solution and the concentration of the solution itself, it was possible to obtain films with thickness varying from 0.2 to 6 microns.

The films, prepared according to the method described above, had good mechanical resistance. The mechanical properties are recorded in Table 1.

TABLE 1
Mechanical properties of completely dry films

| Type of film | (a) | (b) | (c) | (d) |
| --- | --- | --- | --- | --- |
| Mechanical properties:[1] | | | | |
| Tensile strength (kg./cm.$^2$) | 730 | 810 | 835 | 637 |
| Elongation at break (percent) | 3 | 5 | 7.8 | 23.7 |
| Elastic modulus (kg./cm.$^2$) | 29,600 | 31,000 | 28,000 | 35,600 |

[1] Determined at 23° C., 65% relative humidity, according to ASTM-D 882.
 (a) Poly(2-methylpiperazinfumaramide); film obtained from HCOOH solution.
 (b) Poly(trans-2,5-dimethylpiperazinfumaramide); film obtained from HCOOH solution.
 (c) Poly(trans-2,5-dimethylpiperazinfumaramide); film obtained from CHCl$_3$/CH$_3$OH solution.
 (d) Poly(trans-2,5-dimethylpiperazinmesaconamide); film obtained from CHCl$_3$/CH$_3$OH solution.

(B) Use of the completely dry films in the desalination of saline solutions

The films prepared as described in paragraph A above were put into a standard type reverse osmosis cell. An aqueous saline solution, the content of which varied from test to test, was used as the feed. The linear flow rate of the feed solution to the surface of the film was 100 cm./sec., and the pressure was between 50 and 150 atmospheres.

In Table 2 the data and results are given which were obtained when employing as the feed an aqueous solution containing 5000 p.p.m. of NaCl.

The values of permeability to water, $P_{H_2O}$ (in gr./cm. sec.), were calculated from the flux and saline rejection values according to the method of Lonsdale, Merten & Riley (J. Appl. Polymer Sci. 9, 1341 (1965)).

TABLE 2
Osmotic properties of completely dry film (feed aqueous solution containing 5,000 p.p.m. of NaCl)

| (1) | (2) | (3) | (4) | (5) | (6) | (7) | (8) | (9) |
| --- | --- | --- | --- | --- | --- | --- | --- | --- |
| Type of membrane | Solvent for preparing the film | Thickness of the film (microns) | Pressure of feed (atm.) | Flow of desalinized water (liter/day/m.$^2$) | Saline concentration in the product water (p.p.m. of NaCl) | Saline rejection (percent) | Permeability to water $P_{H_2O}$ (gr./cm. sec.) | Flow of water determined for film of uniform thickness of 1 micron (liter/day·m.$^2$) |
| A | HCOOH | 25 | 80 | 43.0 | 900 | 82.0 | 2.3×10$^{-6}$ | 1,075 |
| B | HCOOH | 40 | 50 | 9.8 | 440 | 91.2 | 1.4×10$^{-6}$ | 392 |
| B | HCOOH | 40 | 80 | 12.0 | 295 | 94.1 | 1.0×10$^{-6}$ | 480 |
| B | HCOOH | 40 | 105 | 13.5 | 175 | 96.5 | 0.87×10$^{-6}$ | 540 |
| B | CHCl$_3$/CH$_3$OH | 30 | 50 | 10.0 | 430 | 91.4 | 1.1×10$^{-6}$ | 300 |
| C | CHCl$_3$/CH$_3$OH | 48 | 50 | 8.2 | 910 | 81.8 | 1.4×10$^{-6}$ | 393 |
| D | Acetone | 40 | 50 | 1.55 | 76 | 98.4 | 0.22×10$^{-6}$ | 62 |
| D | do | 40 | 80 | 2.42 | 70 | 98.6 | 0.21×10$^{-6}$ | 97 |

A = poly(2-methyl-piperazinfumaramide);
B = poly(trans-2,5-dimethyl-piperazinfumaramide);
C = poly(trans-2,5-dimethyl-piperazinmesaconamide);
D = cellulose acetate Eastman 398-3.

The foregoing data, obtained with completely dry films, show that the permeability to water of the films of this invention is very high and is distinctly superior to that of a film of cellulose acetate obtained by casting a 20% solution of Eastman 398-3 cellulose acetate (trademark of Eastman Kodak Chem. Co.) in acetone.

In column 9 of Table 2 the flow rate of water is recorded, calculated for a film with a uniform thickness of 1 micron. These values show that the higher permeability to water, $P_{H_2O}$, of the films of this invention, with the thickness remaining the same, enables one to obtain a flow rate of at least five times greater than that which is obtained with a film of cellulose acetate. (The values given in column 9 were calculated by multiplying the values in column 3 by the values in column 5.)

The saline rejection data given in column 7 show that this property is greater than 80% for sodium chloride, and increases with increasing pressure. At a pressure of 105 atmospheres (tests 2, 3 and 4) the value is 96.5%, very close to that for cellulose acetate.

The results obtained by employing as a saline solution containing 10,000 p.p.m. of $MgSO_4$ as the feed are reported in Table 3.

of 42° C. for 20 minutes and was then immersed in water for a few hours at room temperature.

Thereafter, the film was removed from the glass plate and kept in water for 2 hours at 80° C. The film had a white, dull appearance and displayed good tenacity and mechanical resistance.

The thus obtained film had a thickness of about 70 microns. It was put into a standard type reverse osmosis cell. Water at a pressure of 50 atmospheres was used as the feed. The amount of water which passed through the film was 5,000 liters/day/m.² of film surface. This rate of flow remained constant. This film was conveniently used as a support or carrier of high permeability.

TABLE 3

Characteristics of reverse osmosis and saline rejection in test with $MgSO_4$ of completely dry films (feed: aqueous solution containing 10,000 p.p.m. of $MgSO_4$ pressure 50 atm.)

| Number of test | Type of membrane | Solvent for preparing the film | Thickness of the film (microns) | Flow of desalinized water (liter/day·m.³) | Saline composition of the product (p.p.m. of $MgSO_4$) | Saline rejection (percent) |
|---|---|---|---|---|---|---|
| 9 | Poly(trans-2,5-dimethylpiperazinfumaramide) | HCOOH | 28 | 14.7 | 20 | 99.8 |
| 10 | Poly(trans-2,5-dimethylpiperazinmesaconamide) | $CHCl_3/CH_3OH$ | 22 | 19.8 | 63 | 99.3 |

These data, obtained with completely dry films, show that the saline rejection of $MgSO_4$ for the films of this invention is greater than 99%.

The results obtained by using poly(trans-2,5-dimethylpiperazinfumaramide) films of different thicknesses, obtained from HCOOH solution, have been recorded in Table 4. An aqueous saline solution containing 5,000 p.p.m. of NaCl under a pressure of 80 atmospheres was used as the feed.

TABLE 4

Osmotic properties of completely dry film

| Number of test | Thickness of the film (microns) | Flow of desalinized water (liter/day·m.²) | Saline rejection (percent) | Permeability to water $P_{(H_2O)}$ (gr./cm.sec.) |
|---|---|---|---|---|
| 11 | 36 | 15.5 | 94.4 | $1.2 \times 10^{-6}$ |
| 12 | 22 | 24.0 | 93.1 | $1.1 \times 10^{-6}$ |
| 13 | 13 | 38.0 | 93.8 | $1.0 \times 10^{-6}$ |
| 14 | 8.5 | 64.3 | 96.1 | $1.2 \times 10^{-6}$ |

These data, obtained with completely dry films, show that the flow rate of the produced soft water increased with decreasing thickness of the films while the permeability to water remained relatively constant (about $1.1 \times 10^{-6}$ gr./cm. sec.). Moreover, there was no decrease in the saline rejection as the thickness of the film decreased.

EXAMPLE 2

A solution containing 7 g. of poly(trans-2,5-dimethylpiperazinfumaramide) and 0.3 g. of $Mg(ClO_4)_2$ in 92.7 g. of formic acid was spread over a glass plate by means of a film spreader.

The film thus formed was maintained at a temperature

EXAMPLE 3

Use of thin supported films in the desalination of saline solutions

According to the procedures described in Example 1, poly(trans-2,5-dimethyl-piperazinfumaramide) films were prepared, having thicknesses between 1.7 and 8.5 microns. These films were supported on a film, prepared according to the procedure described in Example 2, and having a thickness of 70 microns. The coupled film was put into a standard type reverse osmosis cell. The arrangement inside the cell was such as to have one face of the thin film in contact with the saline feed solution and the other face in contact with the porous support prepared according to the procedure of Example 2. An aqueous solution containing 10,000 p.p.m. of NaCl, at a pressure of 80 atmospheres, was used as the feed.

The results thus obtained are reported in Table 5. Also reported in Table 5 is a test in which the thin film was carried on a cellulose acetate support obtained by casting a solution consisting of: Eastman 398-3 cellulose acetate 11%; $Mg(ClO_4)_2$ 5.5%; $H_2O$ 10% and acetone 73.5%. The film formed from this solution had been gelled in water immediately after its formation.

TABLE 5

Osmotic properties of completely dry ultrathin films of poly(trans-2, 5-dimethyl-piperazinfumaramide) placed on porous supports. (Pressure: 80 atm.; feed: aqueous solution containing 10,000 p.p.m. of NaCl)

| Number of test | Thickness of film (microns) | Solvent for preparing the film | Flow of desalinized water produced (liter/day·m.²) | Saline rejection (percent) | Kind of the porous support |
|---|---|---|---|---|---|
| 15 | 8.5 | HCOOH | 64.0 | 97.8 | Support of Example No. 2. |
| 16 | 6.2 | HCOOH | 85.5 | 98.2 | Do. |
| 17 | 6.0 | HCOOH | 89.5 | 98.2 | Do. |
| 18 | 4.0 | HCOOH | 142 | 96.0 | Do. |
| 19 | 1.7 | $CHCl_3/CH_3OH$ | 240 | 94.8 | Do. |
| 20 | 6.0 | HCOOH | 63.4 | 97.6 | Support of cellulose acetate.[a] |

[a] Cellulose acetate Eastman 398-3. Composition of csating solution Eastman 398-3, 11%; $Mg(ClO_4)_2$, 5.5%; $H_2O$, 10%; acetone, 73.5%.

The data of Table 5 show that by using the films of this invention, carried on porous supports, it is possible to obtain saline rejections of sodium chloride greater than 98%, a value comparable with that of the saline rejection of cellulose acetate films.

EXAMPLE 4

A poly(trans-2,5-dimethylpiperazinfumaramide) film prepared according to the procedures of Example 1, having a thickness of 36 microns, was put into a standard type reverse osmosis cell.

An aqueous solution containing 35,000 p.p.m. of NaCl (synthetic sea water), at a pressure of 95 atmospheres and at a linear flow rate of 100 cm./sec., was used as the feed.

A flow of 12 liters/m.$^2$·day of water with a saline rejection of 92% was obtained. The permeability to water ($P_{H_2O}$) amounted to $1.0 \times 10^{-6}$ (gr./cm. sec.).

EXAMPLE 5

Two membranes of the gel-type were prepared according to the following procedure.

A solution was prepared containing 15 g. of poly(trans-2,5-dimethylpiperazinfumaramide), 15 g. of formamide and 70 g. of 98% formic acid.

This solution was then spread over a glass plate maintained at 40° C. The film spreader was regulated in such a way as to form a film having a thickness of about 200 microns. The glass plate was then immersed in a mixture of water and ice and kept there for 1 hour. After removal from the glass plate, the film was kept in water for 24 hours. The thus obtained membrane had a thickness of 110 microns and a water content of 69%.

The membrane was then put into a standard type reverse osmosis cell. A solution containing 10,000 p.p.m. of NaCl at a pressure of 80 atmospheres was used as the feed. A flow of desalinized water equal to 650 liters/m.$^2$·day, with a saline rejection of 52%, was obtained.

A second film was prepared from the same solution by casting on a glass plate. The film thus formed was kept at 40° C. for 15 minutes to evaporate the solvent.

The film was then immersed in a mixture of water and ice for 1 hour. After removal from the glass plate, the film was kept in water for 24 hours. The thus obtained membrane had a thickness of 100 microns and a water content of 70%.

The film was put into a reverse osmosis cell according to the procedures of the preceding test, with a resulting flow of desalinized water of 240 liters/m.$^2$·day, and a saline rejection of 73%.

EXAMPLE 6

A solution was prepared which contained 8 g. of poly trans-2,5-dimethylpiperazinfumaramide) and 2 g. of poly(hexamethylenadipamide) in 90 grams of 98% formic acid. A film was prepared from this solution by following the procedure described in Example (A). The film had a thickness of 65 microns and was put into a standard type reverse osmosis cell. An aqueous solution containing 5,000 p.p.m. of NaCl, at a pressure of 80 atmospheres and a flow rate of 100 cm./sec., was used as the feed. A flow of water equal to 4.1 liters/m.$^2$·day, with a saline rejection of 94%, was obtained.

Variations can, of course, be made without departing from the spirit of our invention.

Having thus described our invention, what we desire to secure by Letters Patent and hereby claim is:

1. In a reverse osmosis process for separating solute from solvent, this process comprising disposing a solution of said solute in said solvent on one side of a semi-permeable membrane and disposing said solvent on the other side thereof, said membrane permitting passage therethrough of said solvent but not said solute, and applying a hydraulic pressure against said solution and said membrane, said pressure being greater than the osmotic pressure of said solution, an improvement comprising employing as said membrane, a synthetic polyamide from the group consisting of poly(trans-2,5-dimethyl-piperazinfumaramide), poly-(2-methyl-piperazinfumaramide), and poly(trans-2,5-dimethyl-piperazinmesaconamide).

2. A process as claimed in claim 1 wherein the synthetic polyamide is poly(trans-2,5-dimethyl-piperazinfumaramide).

References Cited

UNITED STATES PATENTS

| | | | |
|---|---|---|---|
| 3,422,008 | 1/1969 | McLain | 210—22 |
| 3,472,766 | 10/1969 | Rosenbaum | 210—321 |
| 3,567,632 | 3/1971 | Richter et al. | 210—321 X |
| 2,783,894 | 3/1957 | Lovell et al. | 210—500 |
| 3,554,379 | 1/1971 | Pye | 210—500 X |
| 3,497,451 | 2/1970 | Hoehn et al. | 210—23 |
| 3,524,546 | 8/1970 | Hoehn et al. | 210—23 |
| 2,252,554 | 8/1941 | Carothers | 210—500 |

REUBEN FRIEDMAN, Primary Examiner

R. BARNES, Assistant Examiner